(12) United States Patent
Warren et al.

(10) Patent No.: US 6,266,030 B1
(45) Date of Patent: Jul. 24, 2001

(54) FLEXIBLE SELF-ACTUATED STRUCTURE AND ASSOCIATED METHOD

(75) Inventors: Ryon C. Warren, Kent; David E. Dyer, Renton, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/535,994

(22) Filed: Mar. 27, 2000

(51) Int. Cl.[7] .................................................. H01Q 15/20

(52) U.S. Cl. ...................... 343/915; 343/881; 343/DIG. 2

(58) Field of Search .................................... 343/915, 916, 343/DIG. 2, 880, 881, 878, 912

(56) References Cited

U.S. PATENT DOCUMENTS

| | | |
|---|---|---|
| 3,568,192 | 3/1971 | Dawson . |
| 3,780,375 | 12/1973 | Cummings et al. . |
| 3,978,490 | 8/1976 | Fletcher et al. . |
| 4,030,102 * | 6/1977 | Kaplan et al. ......................... 343/915 |
| 4,133,501 | 1/1979 | Pentlicki . |
| 4,262,293 | 4/1981 | Parmer . |
| 4,315,265 | 2/1982 | Palmer et al. . |
| 4,608,571 | 8/1986 | Luly . |
| 4,683,475 | 7/1987 | Luly . |
| 4,780,726 | 10/1988 | Archer et al. . |
| 5,104,211 | 4/1992 | Schumacher et al. . |
| 5,227,808 | 7/1993 | Davis . |
| 5,264,863 | 11/1993 | Miner, Jr. et al. . |
| 5,527,001 | 6/1996 | Stuart . |
| 5,570,102 | 10/1996 | Kochiyama et al. . |
| 5,574,472 | 11/1996 | Robinson . |
| 5,635,946 | 6/1997 | Francis . |
| 5,977,932 * | 11/1999 | Robinson ............................... 343/895 |
| 6,028,570 * | 2/2000 | Gilger et al. .......................... 343/915 |

OTHER PUBLICATIONS

U.S. Statutory Invention Registration No. H373 Entitled *Antenna Stowing and Release Assembly for a Terminal Delivery Vehicle*; Inventor: Heckman; Published: Nov. 3, 1987.

Article Entitled Advanced Satcoms Pace Asian Space Technology; Author: Craig Covault; Published in the Dec. 7, 1998 issue of Aviation Week & Space Technology by McGraw–Hill Company; pp. 50–52.

* cited by examiner

*Primary Examiner*—Don Wong
*Assistant Examiner*—Hoang Nguyen
(74) *Attorney, Agent, or Firm*—Alston & Bird LLP

(57) ABSTRACT

A self-actuated structure, such as an antenna structure, is provided that can be stowed in a compact manner and can be deployed in a self-actuated fashion. The self-actuated structure includes a flexible skin, a boom extending thereacross and rings about which the flexible skin can be folded such that a payload volume is defined therewithin. The self-actuated structure also has a plurality of ribs extending parallel to the boom that cooperate with the flexible skin to define a number of channels extending between the boom and an edge of the flexible skin. The structure also includes a plurality of self-deploying stiffeners disposed within respective channels. In this regard, the stiffeners can have an unbiased relaxed shape, such as a "U" shape, in the absence of external forces and a biased shape, such as a flat shape, upon the application of external bias forces. As such, the application of external bias forces, such as by cables interconnecting the rings and an outermost rib, can cause the stiffeners to assume a biased shape, i.e., a flat shape, by moving the structure into the first position, typically a stowed position, while the removal of external bias forces allows the stiffeners to assume the unbiased relaxed shape, which moves the structure into the second position, typically a deployed position.

32 Claims, 5 Drawing Sheets

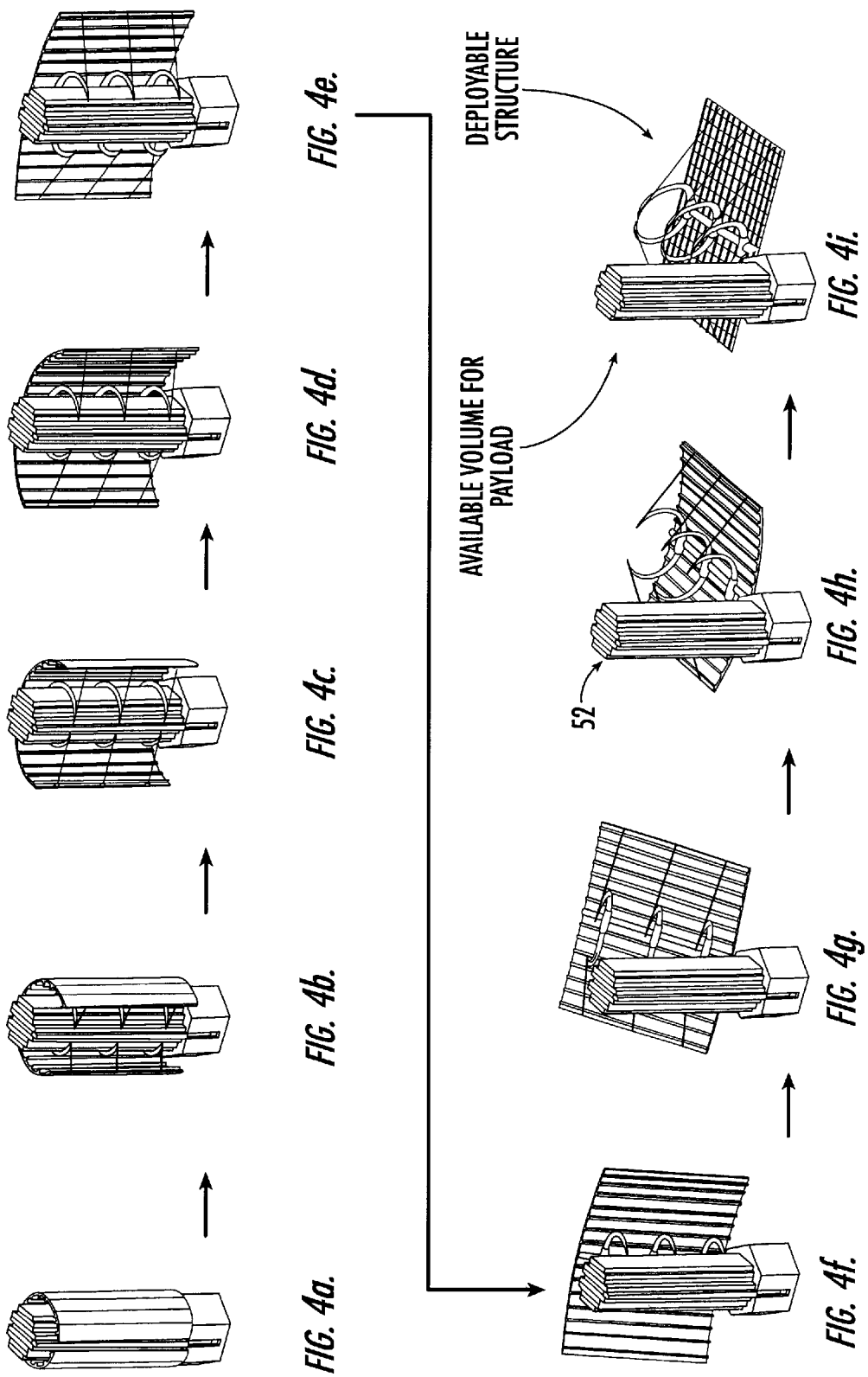

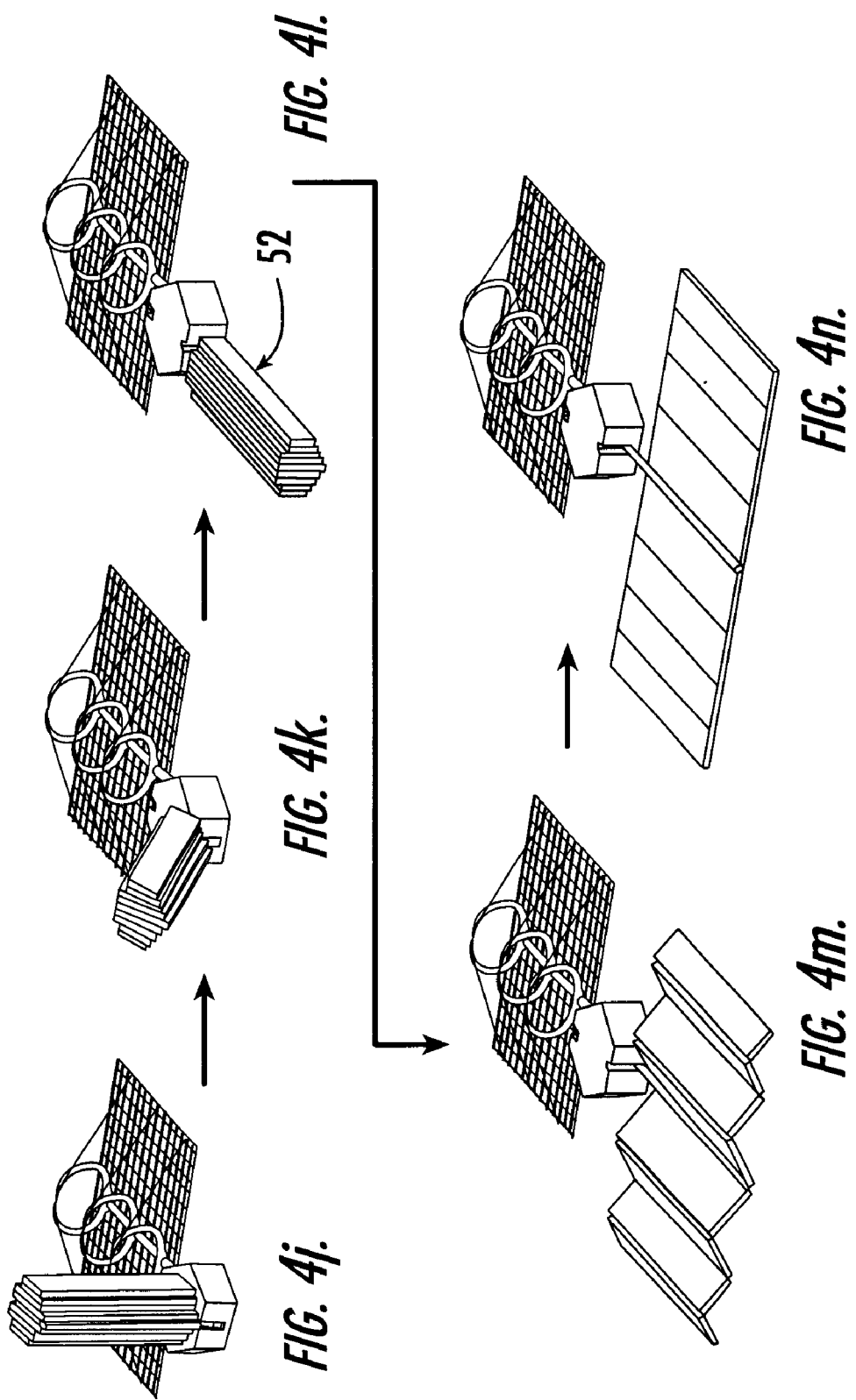

FLEXIBLE SELF-ACTUATED STRUCTURE AND ASSOCIATED METHOD

FIELD OF THE INVENTION

The present invention relates in general to a flexible self-actuated structure, and more particularly to a self-actuated structure useful in supporting land and space based communications.

BACKGROUND OF THE INVENTION

Structures that can be collapsed during transit and deployed upon reaching their destination have been widely used, particularly in situations in which cargo space is limited or otherwise at a premium. Advantageously, collapsible structures may be stowed compactly in a vehicle while not in use, and then deployed to a desired configuration to perform a given application. Although the space-saving characteristics of collapsible structures benefit many applications, space applications in particular stand to benefit to a high degree due to the limited amount of cargo space onboard a spacecraft and the high cost of space travel.

Large antennas are oftentimes deployed to orbit the earth and to perform various tasks, such as collecting radar images, tracking ground-based and air-based targets, and providing high-bandwidth communications. Such antennas usually require relatively large apertures, as well as heavy electronics packaging and support structures. In addition, most antennas cannot be retracted and collapsed once fully deployed. As a result, the antennas cannot be collapsed into a spacecraft and returned to Earth for future applications. Although lightweight electronics packaging and support structures may reduce total mass, the antennas still generally require large apertures such that the overall antenna structure remains quite large. Since the antennas are generally transported into space onboard a spacecraft, an important design factor is the ability to efficiently package a large antenna structure inside of the launch vehicle payload volume, while still permitting the antenna to be deployed once in space.

Several approaches currently are used to address the transportation of large deployable antenna systems on a spacecraft. One method utilizes discrete folding panels that are capable of folding into a relatively small size, but that deploy into the larger antenna structure when in orbit. Under this approach, however, the folded panels produce a dense stowed package that leaves little room for storing other objects. Another method commonly used to stow large deployable space structures that are formed of a number of tubes is to fold and/or nest the tubes. The tubes can then be unnested and unfolded to produce a truss structure of a desired size, shape, and stiffness. Under this approach, however, the size of the deployed structure and the complexity of the electronics packaging being supported by the structure requires a highly complex system of hinges, cables, and drive components. As a result, the structure is generally relatively unreliable and is disadvantageously heavy.

It would therefore be desirable to provide a deployable antenna structure that not only is relatively light, but can also be stowed and deployed in an effective manner. In order to facilitate the deployment of the antenna, particularly in space applications, it would be desirable to provide a means for deploying and/or retracting the structure without the use of drive components or other motors. Finally, it would be desirable to provide an antenna structure that could be retracted into a vehicle to be used again for future applications.

Accordingly, while a variety of collapsible structures, including antennas, have been developed, most of the structures remain disadvantageously heavy and oftentimes consume a substantial portion of the cargo space. In addition, a number of the collapsible structures require a complex system of hinges, cables and drive components for their deployment. Thus, a collapsible structure, such as an antenna, that can be stowed in a compact manner, can be self-deployed and need not include a mechanically complex deployment system is desirable, particularly for space applications.

SUMMARY OF THE INVENTION

These and other needs are provided, according to the present invention, by a self-actuated structure, such as an antenna structure, that can be stowed in a compact manner and can be deployed in a self-actuated fashion without requiring a complex system of hinges, drive components and the like. As such, the self-actuated structure is particularly well suited for space applications, such as antennas including phased array antennas. It should be noted, however, that the self-actuated structure is not limited to antenna structures as described herein, but may include any rolling or folding structure that requires minimal stowage volume and high reliability deployment.

According to the present invention, the self-actuated antenna structure includes a flexible skin, preferably comprised of a composite material, and an array of electronics packages attached to the skin. In the stowed position, the flexible skin is deformed or folded to a compact shape so as to minimize the portion of the vehicle payload volume that is consumed by the stowed structure. The flexible skin can also store potential energy when in the stowed position. Once stowed, the structure of the present invention preferably defines an internal payload volume in which additional payload, such as additional antenna structures, may be stored for deployment at a later time. The antenna structure includes at least one ring connected to the flexible skin that provides a controlled shape to the stowed structure, thus allowing for control of the internal payload volume. In this regard, the rings may have many different shapes, such as a polygon or circle, depending on the vehicle payload volume. In one advantageous embodiment, the rings are circular such that the stowed shape is substantially cylindrical. Regardless of their shape, the rings act to provide structural stability in both the stowed and deployed positions. In addition, the rings may be hinged to enable the rings to partially open and close for deploying any additional payload.

Advantageously, the structure also includes a plurality of self-deploying stiffeners, which may be attached to the flexible skin by a fastener, epoxy, or the like. The stiffeners are designed to store potential energy such that the stiffeners can move the self-actuated structure from a first position, such as a stowed position, to a second position, such as a deployed position, without the application of external forces. In this regard, the stiffeners can have an unbiased relaxed shape in the absence of external forces and a biased or buckled shape, such as a flat shape, upon the application of external bias forces. As such, the application of external bias forces can cause the stiffeners to assume the biased shape which moves the structure into the first position, typically a stowed position, while the removal of external bias forces allows the stiffeners to assume the unbiased relaxed shape which moves the structure into the second position, typically a deployed position.

The structure can also include a plurality of cables and a motor that cooperate to apply the external forces that move the structure from the deployed position to the stowed position, such as by pulling the flexible skin toward and around the rings. The external forces cause the self-deploying stiffeners to buckle or collapse, thereby storing potential energy in the self-deploying stiffeners. This energy is later used to deploy the structure from the stowed position to the deployed position without having to apply any additional external force. During the deployment, the cables can control the deployment rate. In an alternative embodiment, the stiffeners may be in an unbiased or relaxed shape while the structure is in the stowed position, wherein the cables must apply external forces to pull the skin away from the rings and toward the deployed or biased position, resulting in potential energy being stored in the stiffeners while in the deployed position. The stored energy is later used to stow the structure from the deployed position, while the cables control the stowage rate. In both embodiments, the potential energy stored in the stiffeners obviates the need for Additional energy input (such as from a motor or actuator), resulting in a lighter structure with reduced complexity.

In one advantageous embodiment, deployment of the structure is achieved by slowly paying out the cables until the flexible skin is partially open. In order to allow the flexible skin to unfold to its final position, the rings then partially open. By opening, the rings permit additional cargo to be stored within the rings, thereby insuring that the packing density is maximized. Once the skin is unfolded, the structure can then rotate to its deployed position by a deployment boom. In this embodiment, the rings typically close once the structure is in the deployed position, followed by further paying out the cables to allow the self-deploying stiffeners to return to their unbiased relaxed shape, thus stiffening the structure. The sequence of operations can be varied somewhat since, in another embodiment, the self-deploying stiffeners are first allowed to return to their unbiased relaxed shape once the structure is in its deployed position, prior to closing the rings.

The self-actuated structure can also include a plurality of ribs that are operably connected to the flexible skin. As a result, the flexible skin and the ribs define a plurality of channels through which the self-deploying stiffeners extend. The channels are preferably sized to permit the stiffeners to move between their unbiased shape and their biased shape. In one embodiment, the self-deploying stiffeners have an unbiased shape resembling a "U-shape" when the structure is in the deployed position, wherein the ends of the self-deploying stiffeners are in contact with the ribs. As the structure of this embodiment is moved to the stowed position, tensile forces applied through the cables act to substantially flatten the stiffeners into the biased shape. Thus, the channels are defined between the ribs and the flexible skin such that the stiffeners may move between the unbiased and biased shapes therein.

According to one embodiment, a lightweight antenna structure that can be advantageously stowed in a compact form and that can be self-deployed once in space. As a result, the antenna structure may lower the cost of the portion of each launch attributable to transporting the antenna structure into orbit, and may reduce the overall number of launches required to place the desired number of antenna structures in orbit since the antenna structure can be stowed more compactly. Additionally, the antenna includes fewer parts that current self-deploying antenna structures, thus reducing fabrication costs and improving safety and reliability.

BRIEF DESCRIPTION OF THE DRAWINGS

FIG. 3b is a cross-sectional side cross-section view of the portion of a self-actuated structure according to one embodiment of the present invention as shown in FIG. 3a; and FIGS. 4a–4n are a plurality of perspective views showing a typical deployment sequence of a self-actuated structure according to one embodiment of the present invention.

DETAILED DESCRIPTION OF THE PRESENT INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
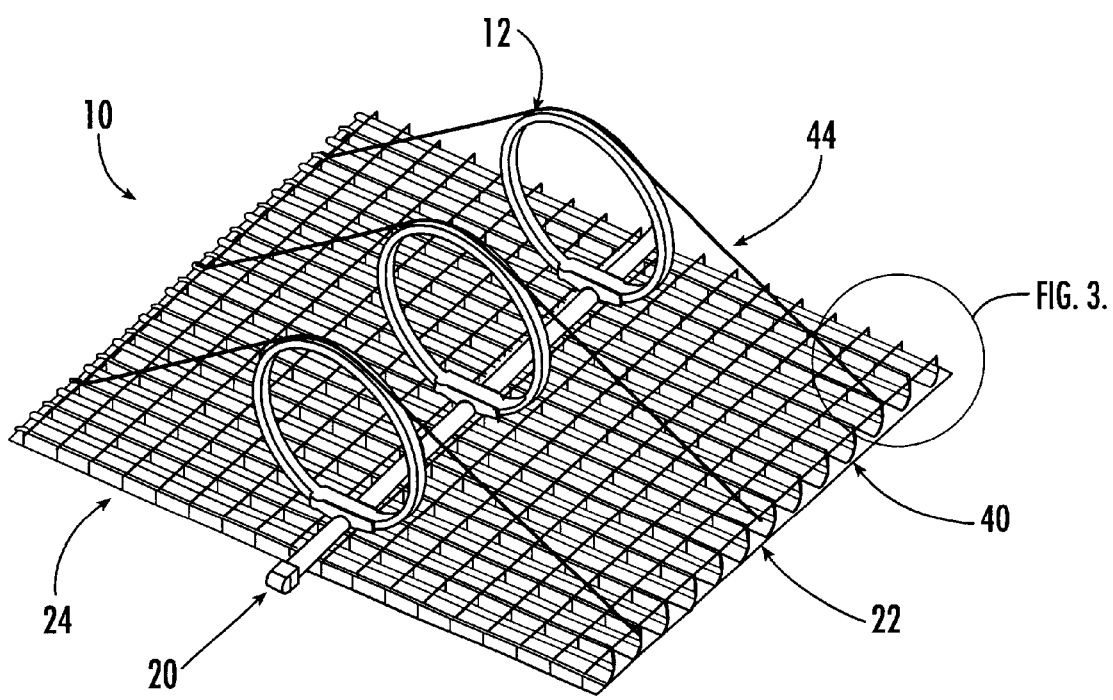
FIG. 1 is a perspective view of a self-actuated structure according to one embodiment of the present invention in the deployed configuration.
Figure 2:
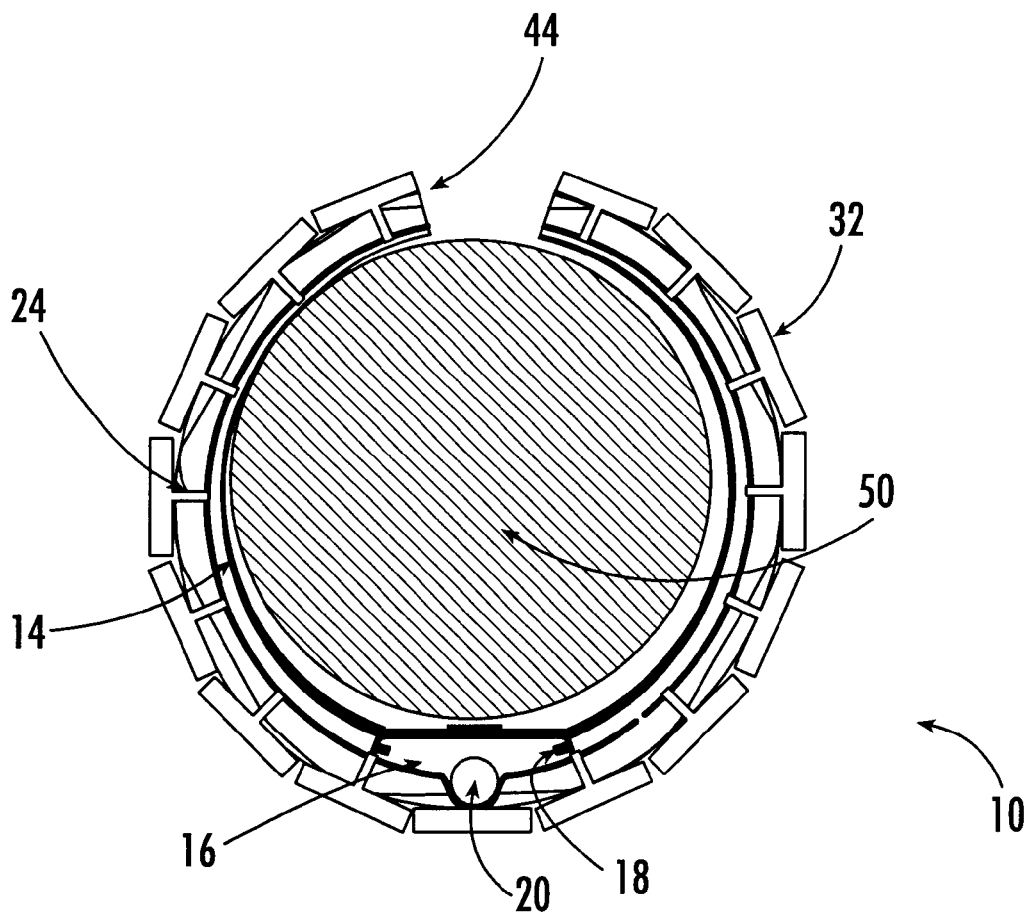
FIG. 2 is an end view of a self-actuated structure according to one embodiment of the present invention in the stowed configuration.

Turning first to FIGS. 1, 2 and 3, there are shown perspective and end views of the flexible self-actuated structure 10 in accordance with one embodiment of the present invention. As shown, the self-actuated structure can advantageously be an antenna, such as a phased array antenna for space applications. However, the self-actuated structure can have other forms and other applications without departing from the spirit and scope of the present invention.

FIG. 1 illustrates the structure 10 in the deployed configuration. As shown, the self-actuated structure includes a flexible skin 22. Typically, the flexible skin is formed of a composite material, such as a graphite, carbon, or kevlar/epoxy composite, such that the mechanical properties can be tailored for the specific application. However, the flexible skin can be formed of other materials so long as the material is relatively flexible and sufficiently durable for the intended application. Although not necessary for the practice of the present invention, the self-actuated structure can include various electronics assemblies 32 mounted upon the flexible skin, particularly in instances in which the structure is an antenna and the electronics assemblies are antenna elements that collectively form a phased array.

The self-actuated structure 10 also includes a main deployment boom 20 that is connected to and extends across the flexible skin 22. Typically, the boom is attached to the flexible skin by fasteners, clips, and/or adhesive bonding. Fasteners as described herein may be defined as rivets, bolts and nuts, or screws, although other fasteners may also be used. The self-actuated structure also includes at least one ring and, more typically, a plurality of rings 12. Each ring has opposed side portions 14, a base portion 16, and a plurality of hinges 18 to hingedly attach the side portions to the base portion 16 such that the rings can be opened and closed, as described below. As shown in FIGS. 1 and 2, the base portion of each ring is attached to the boom such that the rings are spaced, as required for stiffness and strength requirements, along the length of the boom.

Figure 3A:
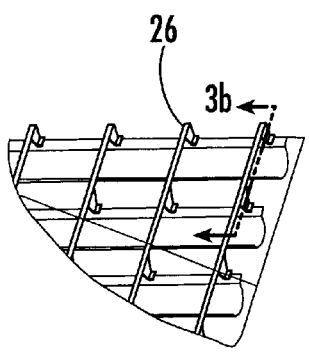
FIG. 3a is a fragmentary perspective view showing the ribs, flexible skin, and self-deploying stiffeners of a self-actuated structure according to one embodiment of the present invention.
Figure 3B:
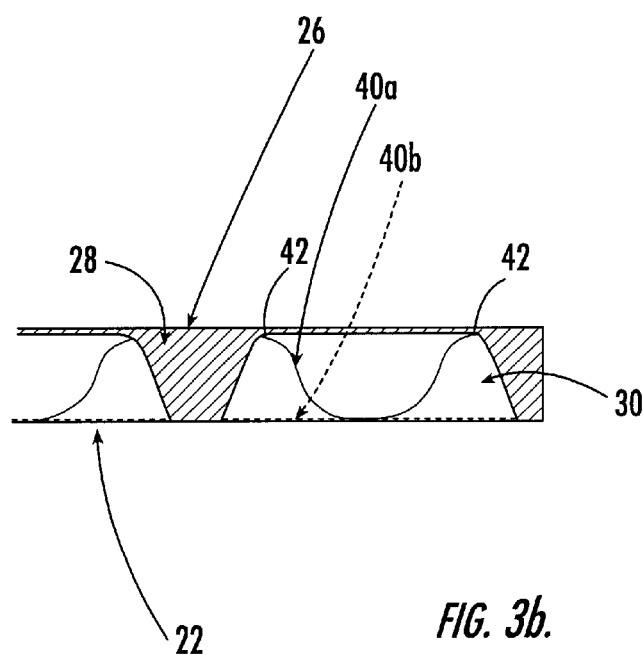

The self-actuated structure 10 also includes a plurality of ribs 24 extending across the flexible skin 22. Typically, the ribs extend in a parallel fashion across the flexible skin in a direction also parallel to the main boom. Each rib preferably includes a cross member 26 and a plurality of support structures 28. As shown in FIGS. 3a and 3b, the support structures 28 are commonly projections that are spaced along the respective cross member. The distal end of each support structure is attached to the flexible skin 22, such as by fasteners, clips, and/or adhesive bonding. As such, the cross member is spaced from the flexible skin. In addition, each rib preferably includes the same number and the same spacing of projections such that corresponding projections are aligned. As such, a plurality of channels 30 are defined by the support structures 28, the cross member 26, and the flexible skin 22. The channels extend across the flexible skin in a direction perpendicular to the ribs.

As shown in FIGS. 1 and 3b, the self-actuated structure 10 also includes a plurality of self-actuating stiffeners 40. Although the stiffeners can be connected to the flexible skin in different manners, the lengthwise extending center portion of each stiffener is typically connected to the flexible skin by fasteners, clips, and/or adhesive bonding. Each stiffener can be connected continuously from side-to-side of the flexible skin, or the stiffener can be connected at a plurality of discrete points along its length. The rings 12, ribs 24, stiffeners 40 and boom 20 can be formed of various and different materials, but are formed of composite materials, such as uniaxial carbon or kevlar fibers, in one advantageous embodiment.

Each stiffener 40 extends through a respective channel 30 from the boom 20 to the outer edge of the flexible skin 22. In a preferred embodiment, the stiffeners 40 can assume first and second positions with the stiffener having a biased shape 40b in the second position and an unbiased shape 40a in the first position. In the unbiased shape 40a, the stiffeners 40 have a "U" shape and act as support members for the structure 10. See the unbiased shape of the stiffeners depicted in solid lines in FIG. 3b. Comparatively, the stiffeners 40 are substantially flat or planar in the biased shape 40b as shown in dashed lines in FIG. 3a. As discussed below, external forces act on the stiffeners to force the stiffeners 40 into the biased shape 40b while moving the structure 10 into the stowed position. In this regard, the flexible skin 22 is resiliently stretched such that the flexible skin stows potential energy therein. In addition, when moved into the biased shape 40b, the stiffeners 40 also store potential energy, which may be utilized to deploy the structure 10 as the stiffeners return to the unbiased shape.

In one advantageous embodiment depicted in cross-section in FIG. 3b, the ribs 24 are designed to define channels 30 that facilitate movement of the stiffeners 40 between the biased and unbiased shapes. In this regard, the support structures 28 preferably have a wedge-like shape with the broader portion of the support structure proximate the cross member 26 and the narrower portion of the support structure proximate the flexible skin 22. Correspondingly, the channel is wider proximate the flexible skin such that the stiffener can lie near or upon the flexible skin once the stiffener has been substantially flattened into the biased shape, while still accepting the unbiased, U-shaped stiffener within the narrower portion of the channel proximate the cross member.

The self-actuated structure 10 also includes means for drawing the stiffeners 40 into the biased position. As described in more detail below, the flexible skin 22 is preferably wrapped about the rings 12 once the stiffeners are drawn into the biased position, such that the self-actuated structure is in a stowed position. In the stowed position, preferably both the flexible skin 22 and stiffeners store potential energy. Upon releasing the forces that serve to hold the stiffeners in the biased position, the potential energy stored in the stiffeners and flexible skin is released—allowing the stiffeners to return to their unbiased, substantially U-shapes and causing the flexible skin to be unfurled. As such, the structure can be self-actuated or self-deployed such that the flexible skin assumes a substantially flat shape.

In one advantageous embodiment, the means for drawing the stiffeners 40 into the biased position includes a plurality of cables 44, typically formed of a high strength material, such as aluminum or steel. Other materials may also be used, such as uniaxial carbon or kevlar fibers. The cables extend between the rings 12, the flexible skin 22, ribs 24, or stiffeners 40, and, more particularly, between the distal end of the side portion 14 of a ring, i.e., that end opposite the hinge 18, and the outermost rib on the same side of the main boom 20 as the side portion of the ring. The self-actuated structure 10 also includes a motor (not shown) that is connected to the cables so as to alternately draw the cables in and release the cables. Upon being drawn in, the cables force the structure 10 from a deployed position to a stowed position, as shown in FIGS. 1 and 2, respectively. According to a preferred embodiment, when the structure 10 is in the stowed position, the potential energy stored in the stiffeners 40 is offset by the continuing force maintained by the cables 44. As a result, the structure 10 will remain in the stowed position until the cables 44 are at least partially payed out, allowing the potential energy stored in the stiffeners 40 to be discharged as the stiffeners 40 move from the biased shape 40b to the unbiased shape 40a.

Referring now to FIG. 2, there is shown the structure 10 in the stowed position, wherein the rings 12 are in a closed position, and the flexible skin 22 and ribs 24 are wrapped around the rings 12. An internal payload volume 50 is defined by the closed rings 12, allowing for additional stowage of other devices. For example, FIG. 4 shows a flat-panel foldable antenna array 52 that occupied the internal payload volume 50 of the structure 10 when the structure 10 was in the stowed position. Once the self-actuated structure has been deployed and the flat-panel antenna array removed from the payload volume, the foldable array 52 can be deployed by means of a motor (not shown), so as to extend outwardly from but remain connected to a boom similar to the boom 20 of the self-actuated structure 10. However, other cargo can be stored in the payload volume, if so desired.

In operation, the structure 10 is first in a stowed position, whereby the internal payload volume 50 is defined by the rings 12. In this position, the flexible skin 22 is wrapped around the rings 12 and maintained in the wrapped position by tension that is maintained in the cables 44. By being capable of assuming the stowed position, the structure can be efficiently stored in a cargo hold of a spacecraft, a truck or other vehicle. Once in position, such as once in orbit, the structure can be deployed. To allow the structure 10 to move from the stowed position to the deployed position, as shown in FIGS. 4a–4i, the motor controllably pays out the cables 44 which allows the potential energy stored in the stiffeners 40 and flexible skin 22 to be gradually released, thereby permitting the stiffeners to begin to take on a curved or unbiased shape which causes the flexible skin to partially unfold from the rings. After the flexible skin 22 has pulled away from the rings 12 by a desired amount, such as about 50% deployed, the rings 12 can be at least partially opened using a motor (not shown) and/or potential energy stored in the stiffeners 40 and flexible skin 22, if cargo, such as a foldable antenna array, is disposed in the payload volume defined by the rings. In this case, the rings 12 should be opened enough, such as about 12–20 degrees, so that a payload occupying the internal stowage volume 50, such as a flat-panel foldable array 52, may be extracted. Although not necessary for the practice of the present invention, the structure of FIG. 4 which includes the flat-panel foldable array 52 next begins to rotate a boom relative to the structure 10, such as by means of the motor. See FIGS. 4j–4n. As such, both antennas can eventually lie in substantially the same plane.

After the cargo occupying the internal payload volume 50 has been deployed or extracted, the cables 44 are payed out to allow the stiffeners 40 to release additional potential energy and to move the structure 10 toward the deployed position shown in FIG. 1. The rings 12 are then moved from the at least partially open position to a closed position to strengthen and stiffen the structure 10. See FIGS. 4h–4i. When the structure 10 is in the deployed position, the stiffeners 40 have released all the stored potential energy and are in an unbiased relaxed shape 40a as shown in FIG. 3b, thereby providing further strength and rigidity to the structure 10. In instances in which the flat-panel foldable array 52 is disposed in the payload volume 50, the flat-panel array is then unfolded as shown in FIGS. 4j–4n as described above. Thereafter, the structure 10 can begin operation, such as by transmitting and/or receiving signals in embodiments in which the structure is a self-actuated antenna support.

If it is desired to recover and/or reuse the structure 10, the structure 10 advantageously may be moved from the deployed position to the stowed position to facilitate storage. To move the structure 10 from the deployed position, the motor (not shown) draws the cables 44, which, in turn, begin to pull the flexible skin 22 around the rings 12. As the flexible skin 22 is at least partially pulled around the rings 12, the stiffeners 40 are forced from an unbiased relaxed shape 40a to a biased flat shape 40b, storing potential energy in the process. Before or while the structure moves from the deployed position to the stowed position, the rings 12 can partially open to store a payload, such as the flat-panel foldable array 52, inside the internal payload volume 50 defined by the rings 12. If opened, the rings are then closed and the motor continues to draw the cables 44 further in until the flexible skin 22 is wrapped around the rings 12, thereby providing a compact package for storage and/or transportation.

From the foregoing it will be seen that there has been shown and described a unique self-actuating structure that provides efficient space utilization while reducing weight and complexity. While particular embodiments of the invention have been shown and described, it will be understood that the invention is not limited thereto since modifications may be made by those skilled in the art, particularly in light of the foregoing teachings. It is therefore contemplated by the following claims to cover any such modifications and incorporate those features which constitute the essential features of these improvements within the true spirit and the scope of the invention.

What is claimed is:

1. A self-actuated structure capable of moving between first and second positions, the structure comprising:
    a flexible skin;
    at least one ring operably connected to said flexible skin; and
    a plurality of stiffeners operably connected to said flexible skin and extending across at least a portion of said flexible skin, each stiffener having an unbiased relaxed shape in the absence of external bias forces, each stiffener also having a biased shape, different than the unbiased relaxed shape, upon the application of external bias forces,
    wherein application of external bias forces causes said plurality of stiffeners to assume the biased shape which moves the self-actuated structure into the first position,
    wherein removal of the external bias forces allows the plurality of stiffeners to assume the unbiased relaxed shape and to move the self-actuated structure to the second position, and
    wherein said flexible skin is folded at least partially around said at least one ring in one of the first and second positions and is at least partially unfolded relative to said at least one ring in the other of the first and second positions.

2. A self-actuated structure according to claim 1, wherein the biased shape of said plurality of stiffeners is a flat shape.

3. A self-actuated structure according to claim 1, wherein the unbiased shape of said plurality of stiffeners is a "U" shape.

4. A self-actuated structure according to claim 1, wherein said plurality of stiffeners serve as a store of potential energy in said biased shape which is released during a transition of said stiffeners to the unbiased relaxed shape.

5. A self-actuated structure according to claim 1, further comprising a plurality of ribs crossing a plurality of said stiffeners and operably connected to said flexible skin to define channels through which said stiffeners extend.

6. A self-actuated structure according to claim 1, further comprising a boom operably connected to said flexible skin.

7. A self-actuated structure according to claim 1, further comprising a plurality of cables, said cables operably connected between said at least one ring and said plurality of stiffeners, said plurality of cables capable of drawing said plurality of stiffeners into said biased shape.

8. A self-actuated structure according to claim 1, further comprising a payload disposed within said at least one ring.

9. A self-actuated structure capable of moving between first and second positions, the structure comprising:
    a flexible skin;
    a plurality of stiffeners operably connected to said flexible skin and extending across at least a portion of said flexible skin; and
    at least one ring operably connected to said flexible skin, wherein said flexible skin is folded at least partially around said at least one ring in one of the first and second positions such that said at least one ring structurally supports said flexible skin and at least partially defines the shape of the self-actuated structure in the respective position, and wherein said flexible skin is at least partially unfolded relative to said at least one ring in the other of the first and second positions.

10. A self-actuated structure according to claim 9, further comprising means for opening said at least one ring.

11. A self-actuated structure according to claim 9, further comprising means for closing said at least one ring.

12. A self-actuated structure according to claim 9, further comprising a plurality of ribs crossing a plurality of said stiffeners and operably connected to said flexible skin to define channels through which said stiffeners extend.

13. A self-actuated structure according to claim 9, further comprising a boom operably connected to said flexible skin.

14. A self-actuated structure according to claim 9, further comprising a plurality of cables, said cables operably connected between said at least one ring and said plurality of stiffeners, said plurality of cables capable of drawing said plurality of stiffeners into said biased shape.

15. A self-actuated structure according to claim 9, further comprising a payload disposed within said at least one ring.

16. A self-deploying antenna structure capable of moving between stowed and deployed positions, the antenna structure comprising:

a flexible skin;

a plurality of stiffeners operably connected to said flexible skin and extending across at least a portion of said flexible skin, said stiffeners capable of moving the self-deploying antenna structure from the stowed position to the deployed position in the absence of external forces; and at least one ring operably connected to said flexible skin and about which said flexible skin is at least partially folded when the self-deploying antenna structure is in the stowed position.

17. A self-deploying antenna structure according to claim 16, further comprising a plurality of electronics packages mounted upon said flexible skin.

18. A self-deploying antenna structure according to claim 16, wherein said plurality of stiffeners serve as a store of potential energy in one of said stowed and deployed positions which is released during a transition of said stiffeners to the other of said stowed and deployed positions.

19. A self-deploying antenna structure according to claim 16, further comprising a plurality of ribs crossing a plurality of said stiffeners and operably connected to said flexible skin to define channels through which said stiffeners extend.

20. A self-deploying antenna structure according to claim 16, further comprising a boom operably connected to said flexible skin.

21. A self-deploying antenna structure according to claim 16, further comprising a payload disposed within said at least one ring.

22. A self-deploying antenna structure according to claim 16, further comprising means for opening said at least one ring while said antenna structure is moving between said stowed and deployed positions.

23. A self-deploying antenna structure according to claim 16, further comprising means for closing said at least one ring while said antenna structure is moving between said stowed and deployed positions.

24. A method of moving a structure between first and second positions, the method comprising:

providing a structure having a flexible skin, at least one ring operably connected to the flexible skin and a payload disposed within the at least one ring, wherein the flexible skin is at least partially folded about the ring when the structure is in the first position;

at least partially unfolding the flexible skin from about the at least one ring to move the structure into the second position;

at least partially opening the at least one ring before the structure reaches the second position; and extracting the payload once the at least one ring is at least partially opened.

25. A method according to claim 24, wherein the providing step comprises mounting a plurality of electronics packages upon said flexible skin.

26. A method according to claim 24, further comprising at least partially closing said at least one ring after extracting said payload.

27. A method according to claim 24, wherein the providing step comprises providing a plurality of cables that are operably connected between said at least one ring and said plurality of stiffeners.

28. A method according to claim 27, wherein the unfolding step comprises controllably paying out the plurality of cables.

29. A method according to claim 24, wherein the providing step includes providing a structure having a plurality of self-deploying stiffeners operable to move the structure from the first position to the second position.

30. A method of moving a structure between first and second positions, the method comprising:

providing a structure having a flexible skin and at least one ring operably connected to the flexible skin, wherein the flexible skin is at least partially unfolded from about the at least one ring when the structure is in the first position and folded about the at least one ring when the structure is in the second position;

at least partially opening the at least one ring before the structure reaches the second position;

stowing a payload within the at least one ring once the at least one ring is at least partially opened; and folding the flexible skin about the at least one ring to bring the structure to the second position.

31. A method according to claim 30, further comprising closing the at least one ring while folding the flexible skin about the at least one ring.

32. A method according to claim 30, wherein the providing step comprises providing a plurality of cables operably connected between said at least one ring and said plurality of stiffeners, and the folding step comprises controllably drawing in the plurality of cables.

* * * * *